United States Patent Office
3,288,799
Patented Nov. 29, 1966

3,288,799
METHOD OF PREPARING BENZIMIDAZOLE N-OXIDES
Meyer Sletzinger, North Plainfield, and George Gal, Summit, N.J., assignors to Merck & Co., Inc., Rahway, N.J., a corporation of New Jersey
No Drawing. Filed Dec. 31, 1964, Ser. No. 422,544
5 Claims. (Cl. 260—302)

This invention is concerned generally with a method of preparing certain benzimidazole-1-oxides. More specifically, it relates to a method for making benzimidazole-1-oxides substituted at the 2-position from an o-nitroaniline and an aldehyde. Still more particularly, it is concerned with a method for making benzimidazole-1-oxides substituted with an aromatic or hetero aromatic group at their 2-position.

According to the instant invention, it has now been found that benzimidazoles having at the 2-position a naphthyl, haloaryl or heteroaromatic group containing nitrogen, sulfur and/or oxygen as a hetero atom or atoms and more particularly those benzimidazole-1-oxides also having at the 5 or 6 position hydrogen, alkyl, halo, phenyl, halophenyl, heterocyclic, ether or thioether radicals may be obtained from an appropriately substituted aniline and an aldehyde. This process may be pictured structurally as follows:

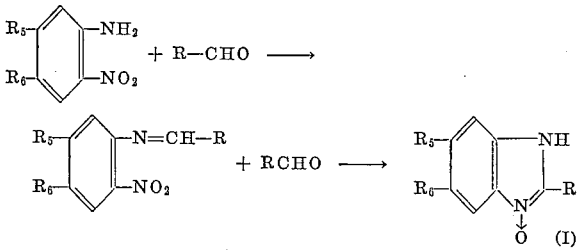

In the structure shown above, R represents a naphthyl or haloaryl radical or a heteroaromatic radical containing from 1–3 hetero atoms, wherein the hetero atoms are nitrogen, oxygen, or sulphur. The haloaryl radicals which may be found at the 2-position of these novel compounds are such that a halo radical, for example, chloro or fluoro, is located ortho with respect to the carbon atom in the aryl group which links said group to the imidazole moiety. Examples of such haloaryl radicals include o-fluorophenyl, o-fluoronaphthyl, o-chlorophenyl, and the like. The heteroaromatic radicals at the 2-position are those having one hetero atom in the ring structure such as thienyl, furyl, pyrryl, pyridyl, coumarinyl, or thiacoumarinyl, two hetero atoms in the ring such as a thiazolyl or isothiazolyl, or three hetero atoms such as thiadiazolyl. The preferred compounds of the invention are those wherein the 2-substituent contains nitrogen and sulphur as hetero atoms, e.g., thiazolyl, isothiazolyl, and thiadiazolyl. $R_5$ and $R_6$ are hydrogen or one of $R_5$ and $R_6$ is alkyl, preferably loweralkyl such as methyl, ethyl, isopropyl and the like, halo, for example chlorine of fluorine, phenyl or a halophenyl group having a halo radical, for example fluoro or chloro, located ortho, meta or para with respect to the phenyl carbon linking the halophenyl group to the benzimidazole moiety. Examples of such halophenyl groups include p-fluorophenyl, p-chlorophenyl, o-fluorophenyl, m-fluorophenyl and the like. $R_5$ and $R_6$, but not both at any one time, also represent a heterocyclic radical such as thienyl and the like, a loweralkoxy or loweralkylthio group such as methoxy, ethoxy, methylthio, propylthio and the like, or a phenoxy or phenylthio group.

It has now been found that an o-nitroaniline may be reacted with an aldehyde of the formula R—CHO, wherein R is as described above in a suitable solvent to obtain the corresponding benzimidazole-1-oxide, and that a Schiff base is the intermediate formed thereby. It will be noted according to the flow diagram above that two moles of aldehyde react with one mole of o-nitroaniline. In order to obtain maximum yields of benzimidazole-1-oxide, it is accordingly preferred that at least two molar equivalents of aldehyde per mole of o-nitroaniline be employed during a particular run.

Prior art shows that 1-unsubstituted benzimidazoles may be prepared by treating an o-phenylene-diamine with an aldhyde of the formula R′—CHO where R′ is a heterocyclic radical. The Schiff base intermediate formed thereby is then converted into the 1-unsubstituted benzimidazole by oxidation with a suitable oxidizing agent, such as cupric acetate, lead acetate, mercuric acetate, air, and the like.

Not being concerned for the moment with substituents on the ring structure which are irrelevant to this discussion, the prior art Schiff base has the formula

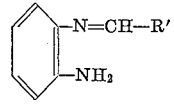

where R′ is as defined above.

The process of this invention, on the other hand, requires that a Schiff base of the formula

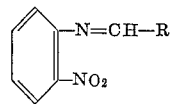

formed by the reaction of an o-nitroaniline and an aldehyde of the formula R—CHO where R is as defined above, react with further aldehyde to obtain the desired benzimidazole-1-oxide. It is accordingly clear that the process of this invention requires that a nitro rather than an amino substituent remain on the ring structure of the Schiff base.

Reducing agent may be added to the reaction mixture to prevent oxidation of certain of the aldehyde reactants; but for the reasons outlined above, at no time should there be present in the mixture a reducing agent which to any substantial degree will reduce the nitro substituent to an amino substituent.

The temperature of the reaction is not critical but temperatures of from about 60° C. to about 200° C. are generally most convenient. It will be noted that at reflux the boiling temperature of the solvent will be substantially the reaction temperature of the mixture. Accordingly, the reaction temperature desired may be obtained by judicious selection of solvent. Solvents useful for this process are preferably organic in nature and inert with respect to the starting and final products. As illustrative of those solvents which may be useful for this reaction, there may be mentioned aromatic hydrocarbons such as benzene, toluene, xylene and the like, ethyl benzene, decahydronaphthalene or tetrahydronaphthalene, and the like. The product may be recovered or recrystallized by normal techniques such as by dissolution in ethanol or methylene chloride, and the like, and crystallization by solvent evaporation.

The benzimidazole-1-oxides of Formula I hereinabove are useful in combatting helminthiasis in animals such as sheep, goats, cattle, horses and swine. When employed as anthelmintic agents, they are orally administered to the animals in the form of a drench or a bolus, or admixed with the feed of the animals. These oxides are also useful as intermediates in preparing the corresponding 1-loweralkoxy benzimidazoles. This preparation involves treating a benzimidazole-1-oxide in inert organic solvent with a strong base such as sodium hydroxide and a loweralkylating agent such as methyl iodide.

The following examples are given for the purpose of illustration and not by way of limitation:

EXAMPLE 1

*2-(4'-thiazolyl)-benzimidazole-1-oxide*

A mixture of 3.45 gm. o-nitroaniline and 5.65 gm. of thiazole-4-carboxaldehyde in 25 ml. of toluene is refluxed for 4 days. The water formed during the reaction is collected in a trap. The solvent is removed in vacuo and the residue is treated with methylene chloride. The insoluble portion of the product is filtered and recrystallized from ethanol to give 2-(4'-thiazolyl)-benzimidazole-1-oxide; M.P. 237–238° C.

When naphthalene-4-carboxaldehyde, o-fluorobenzaldehyde, thiophene-2-carboxaldehyde, 2-furfural, pyran-2-carboxaldehyde or 1',2',3'-thiadiazole-4-carboxaldehyde is used in place of thiazole-4-carboxaldehyde in the above process, there is obtained 2-(4'-naphthyl)-benzimidazole-1-oxide,
2-(2'-fluorophenyl)-benzimidazole-1-oxide,
2-(2'-thienyl)-benzimidazole-1-oxide,
2-(2'-furyl)-benzimidazole-1-oxide,
2-(2'-pyrryl)-benzimidazole-1-oxide, or
2-[4'-(1',2',3'-thiadiazolyl)] benzimidazole-oxide, respectively.

EXAMPLE 2

*2-(3'-thiacoumarinyl)-5-fluoro-benzimidazole-1-oxide*

A solution of 3.12 g. of 2-nitro-5-fluoroaniline and 7.6 g. of thiacoumarin-3-carboxaldehyde in 30 ml. of ethylbenzene is heated under reflux for 3 days. The water formed during the reaction is collected in a trap. The solvent is removed in vacuo and the residue is recrystallized from diidopropylether to give 2-(3'-thiacoumarinyl)-5-fluoro-benzimidazole-1-oxide.

When the above process is carried out and coumarin-3-carboxaldehyde or isothiazole-2-carboxaldehyde is used in place of thiacoumarin-3-carboxaldehyde, there is obtained 2-(3'-coumarinyl)-5-fluoro-benzimidazole-1-oxide or 2-(2'-isothiazolyl)-5-fluoro-benzimidazole-1-oxide, respectively.

EXAMPLE 3

*2-(4'-thiazolyl)-5-fluoro-benzimidazole-1-oxide*

To 5 gm. of 2-nitro-5-fluoroaniline is added 6 gm. of thiazole-4-carboxaldehyde in xylene and the mixture is refluxed for 3 days. The solvent is removed in vacuo and 40 ml. of ethanol is added to the residue. The undissolved portion is filtered and recrystallized from ethanol to give 2-(4'-thiazolyl)-5-fluoro benzimidazole-1-oxide.

When the above process is carried out and 2-nitro-4-ethylaniline, 4-nitro-3-aminobiphenyl, 4-nitro-3-amino-4'-fluorobiphenyl, or 2-nitro-5-methylthioaniline is used in place of 2-nitro-5-fluoroaniline, there is obtained 2-(4'-thiazolyl)-6-ethyl benzimidazole-1-oxide, 2-(4'-thiazolyl)-5-phenyl benzimidazole-1-oxide, 2-(4'-thiazolyl)-5-(4'-fluorophenyl)benzimidazole-1-oxide, or 2-(4'-thiazolyl)-5-methylthio benzimidazole-1-oxide, respectively.

EXAMPLE 4

*2-(3'-pyridyl)-5-phenylthio benzimidazole-1-oxide*

2-nitro-5-phenylthioaniline (4.9 g.) and pyridine-3-carboxaldehyde (2.2 g.) are dissolved in 35 ml. of decahydronaphthalene and the solution is refluxed for 40 hours at 185–190° C. The water formed is separated during the reaction in a trap. The solvent is removed in vacuo and the residue is recrystallized from isopropanol to give 2-(3'-pyridyl)-5-phenylthio benzimidazole-1-oxide.

When 2-nitro-5-(2'-thienyl)-aniline, 2-nitro-4-methoxyaniline or 2-nitro-5-phenoxyaniline is used in the above process in place of 2-nitro-5-phenylthioaniline, there is obtained 2-(3'-pyridyl)-5-(2'-thienyl)-benzimidazole-1-oxide, 2-(3'-pyridyl)-6-methoxy benzimidazole-1-oxide or 2-(3'-pyridyl)-5-phenoxy benzimidazole-1-oxide, respectively.

EXAMPLE 5

*1-methoxy-2-(4'-thiazolyl)-benzimidazole*

The following procedure is intended for the purpose of disclosing methods generally applicable in preparing 1-loweralkoxy benzimidazoles from the corresponding benzimidazole-1-oxides. It is the invention of D. R. Hoff and M. Sletzinger and is embraced by a patent application entitled "Chemical Compounds and Processes for Their Preparation" executed on even date herewith.

2-(4'-thiazolyl)-benzimidazole-1-oxide (0.651 g.) is added to a solution of 0.12 g. of sodium hydroxide in 6 ml. of methanol. To the clear solution is added 0.465 g. of methyliodide and the mixture is heated at 55° to 60° C. for five hours. The solvent is removed in vacuo. The oily residue is diluted with 5 ml. of water and solidifies on standing. 1-methoxy-2-(4'-thiazolyl)-benzimidazole is separated by filtration, washed with water and recrystallized from (1:1) methanol-water; M.P. 117–118° C.

It should be understood that although this invention has been described with reference to particular embodiments thereof, changes and modifications may be made which are within its intended scope and it should be limited only by the language of the appended claims.

What is claimed is:

1. A process for preparing a compound of the formula

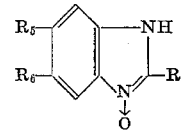

where R is selected from the group consisting of naphthyl, haloaryl and a heteroaromatic radical containing from 1–3 hetero atoms selected from the group consisting of nitrogen, oxygen and sulfur; and $R_5$ and $R_6$ are selected from the group consisting of hydrogen, loweralkyl, halo, phenyl, halophenyl, thienyl, loweralkoxy, loweralkylthio, phenoxy, and phenylthio, wherein at least one of $R_5$ and $R_6$ is hydrogen, which comprises treating a compound of the formula

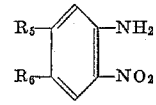

where $R_5$ and $R_6$ are as defined above with a compound of the formula

R—CHO where R is as defined above.

2. A process for preparing a compound of the formula

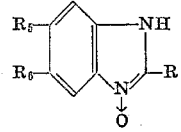

where R is selected from the group consisting of naphthyl, haloaryl and a heteroaromatic radical containing from 1–3 hetero atoms selected from the group consisting of nitrogen, oxygen and sulfur; and $R_5$ and $R_6$ are selected from the group consisting of hydrogen, loweralkyl, halo, phenyl, halophenyl, thienyl, loweralkoxy, loweralkylthio, phenoxy, and phenylthio, wherein at least one of $R_5$ and $R_6$ is hydrogen, which comprises treating a compound of the formula

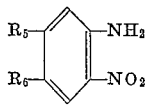

where $R_5$ and $R_6$ are as defined above with at least two molar equivalents of a compound of the formula

R—CHO where R is as defined above in an inert organic solvent at a temperature of about 60° to 200° C.

3. A process for preparing a compound of the formula

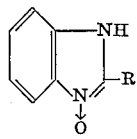

where R is thiazolyl, which comprises treating o-nitroaniline with a compound of the formula

R—CHO where R is as defined above.

4. A process for preparing 2-(4'-thiazolyl)-benzimidazole-1-oxide which comprises treating o-nitroaniline with thiazole-4-aldehyde in an inert organic solvent at a temperature of about 60° C. to about 200° C.

5. A process in accordance with claim 4 wherein the inert organic solvent is an aromatic hydrocarbon.

References Cited by the Examiner

Hinsberg et al., Berichte, volume 29, page 1498.
Takahashi et al., Chem. Pharm. Bull., volume 11 (November 1963), pages 1375 to 1381.

ALEX MAZEL, *Primary Examiner.*

RICHARD J. GALLAGHER, *Examiner.*